United States Patent [19]

Miyatake et al.

[11] Patent Number: 4,613,919
[45] Date of Patent: Sep. 23, 1986

[54] MAGNETIC ERASING HEAD

[75] Inventors: Norio Miyatake, Kobe; Mitsuaki Uenishi, Neyagawa; Nobuo Kashimura, Katano; Keizo Ishiwatari, Kobe, all of Japan

[73] Assignee: Matsushita Electric Industrial Co., Ltd., Osaka, Japan

[21] Appl. No.: 449,225

[22] Filed: Dec. 13, 1982

[30] Foreign Application Priority Data

Dec. 15, 1981 [JP] Japan .................. 56-202712
Jan. 28, 1982 [JP] Japan .................. 57-12387

[51] Int. Cl.$^4$ .............................................. G11B 5/12
[52] U.S. Cl. .................................. 360/118; 360/110
[58] Field of Search ............................... 360/118, 110

[56] References Cited

U.S. PATENT DOCUMENTS 3,772,471 11/1973 Imai et al. ....................... 360/118

FOREIGN PATENT DOCUMENTS 54-55412 2/1979 Japan ................................. 360/118

Primary Examiner—A. J. Heinz
Assistant Examiner—Matthew J. Bussan
Attorney, Agent, or Firm—Stevens, Davis, Miller & Mosher

[57] ABSTRACT

A magnetic erasing head for erasing a magnetic recording media such as magnetic tape. The device has a head surface defined to make sliding contact with the tape surface. The head surface includes a permanent magnet material and a high permeability material. The permanent magnet material defines the portion of the head surface extending from the inlet side toward the exit side thereof for the sliding tape and is magnetized to include portions which have alternate polarities and which have a field strength which gradually decrease from the inlet side to the exit side of the head surface. The high permeability material defines a portion of the head surface with a predetermined length from the exit side toward the inlet side and with a width of about one-half of the recording track of the tape. The high permeability material is positioned substantially in alignment with the center of the recording track. Thus, the magnetic tape erased by the erasing head does not induce secondary harmonic distortion due to mutual cancellation of residual magnetism.

7 Claims, 10 Drawing Figures

→ MOVING DIRECTION OF A TAPE

MAGNETIC FIELD
INTENSITY OF HEAD

MOVING DIRECTION
OF A TAPE

MAGNETIC ERASING HEAD

FIELD OF THE INVENTION

This invention relates to a magnetic erasing head for use in a magnetic recording-reproducing apparatus.

BACKGOUND OF THE INVENTION

Usually, as a method for erasing a signal on a magnetic recording medium such as a magnetic tape, etc., several methods are known such as using an AC field, a DC electromagnet or a permanent magnet, or combining these techniques. Of the methods of using a direct current electromagnet and a permanent magnet, we have a saturation erasure type in which a saturated magnetic field is applied to the recording medium and a gradually decreasing AC field type in which magnetic fields with alternating polarities and gradually decreasing intensities are applied to the recording medium running on the surface of a head.

Conventional erasing heads of the saturation erasure type are as shown in FIGS. 1 and 2, in which a permanent magnet is used to erase an audio compact type or a micro-cassette tape 1. The erasing head shown in FIG. 1 comprises a magnetic material 2, a non-magnetic material 3 and a high permeability material 4. The tape-sliding surface of the magnet material 2 is magnetized to a N or S pole normal to the sliding surface. When the tape 1 slides on the erasing head, a part with a half width is magnetized in one polarity and the signals on R and L tracks are erased. The high permeability material 4 suppresses the spread of the magnetic fluxes from the magnet material 2 and serves to prevent any cross-erasure of the upper half-width part of the magnetic tape 1. The magnetization of a tape which is erased by a head of single pole saturation eraseing type as constituted in such a manner situates at a point 30 or 32 on the B-H curve of FIG. 3. Therefore, if recording or reproduction is performed by using a tape erased by such saturated magnetization, problems of the occurrence of even harmonic distortion and a high noise level will arise because the magnetic tape cannot be erased at a magnetic neutral point 31.

The erasing magnetic head shown in FIG. 2 has a structure which can solve the problem of even harmonic distortion of the above-mentioned head of single pole saturation erasing type. The head comprises magnetic materials (elements) 5, 6, 7, 8 and 9, a non-magnetic material 3 and a high permeability material 4 in a form of accumulated layers. Of the magnetic materials 5 to 9, a group of magnets 5, 7 and 9 and a group of magnets 6 and 8 are made to have an opposite polarity to each other, i.e., N and S poles, respectively shown by the polarity of the tape sliding surface. In this constitution, the central part of the R track of the tape 1 is magnetized by the S-pole of the magnet material 6. Namely, it is magnetized at the point 32 of the B-H curve of FIG. 3. On the other hand, since the both side edge parts of the R track are magnetized by N-poles of the magnetic materials 5 and 7, they are magnetized at the point 30 of the B-H curve. If the width of the magnet material 6 is about a half width of the R track, the nearly half part of the R track is magnetized at the point 30 even if the tape is slid with a certain or slight undulation in the vertical direction. The other half part of the R track is magnetized at the point 32. In a similar way, the L track of the tape 1 is magnetized by the magnet materials 7, 8 and 9. When recording or reproduction is performed by using such a magnetic tape as magnetized in the above-mentioned way, even harmonic distortions generated from parts of the tape which are magnetized respectively at points 30 and 32 are in opposite phase to each other and hence cancelled. Thus, it becomes possible to suppress the degree of distortion caused by recording or reproduction performed at a standard level, to less than 3%. However, this prior art erasing head has a drawback of containing much noise. Such noise is usually called DC erasing noise which becomes significant when the magnetic particle size on the tape is not uniform or when the dispersion of particles is not good. According to the above-mentioned saturation erasure method, the particles on the tape are magnetized to a saturation level under a constant intensity of magnetic field. Therefore, the erasure method is more influenced by the particle size and dispersion and has more noise than the alternating field erasing method which erases at a magnetic neutral point.

In summary, the erasing head as shown in FIG. 1 has a low cost, but a large distortion due to even harmonics and large noise. On the other hand, the head as shown in FIG. 2 has a favorable characteristic from a point of even harmonic distortion but no improvement of noise.

In a magnetic erasing head of gradually decreasing alternating magnetic field type, as shown in FIG. 4, magnetic materials 12 are disposed on a tape sliding surface 11, and the magnetic materials 12 are magnetized in such a manner that they form plural N and S poles with gradually decreasing magnetic field strengths. The magnetic tape is demagnetized in a nearly AC way while it is passing on the magnet materials 12. This conventional magnetic erasing head of a nearly AC type has an advantage of having a larger S/N ratio compared to the saturation erasure type. However, in the case of the nearly AC type, the number of alternating magnetic poles is limited from points of size and magnetization technique. It is at most of the order of 10. Therefore, if the magnetic characteristic of a magnetic tape to be erased is different or if the contact with the magnetic head becomes irregular, the magnetic tape is not erased at a magnetic neutral point 14 of FIG. 5 but has a d.c. residual magnetization m. In FIG. 5, 13 denotes the B-H curve of the magnetic tape and 15 shows the distribution of magnetic field intensity applied by the erasing head to the tape. The magnetic tape draws a minor loop as shown by an arrow toward a final point m of a d.c. residual magnetization. In the case of an erasing head with a small number of alternating magnetic poles, it is extremely difficult to form the magnetic field distribution 15 in such a manner that the magnetic tape after erasure achieves the magnetic neutral point or that the d.c. residual magnetization m becomes zero. Even if the head contacting condition with the magnetic tape has a small or fine variation, the magnetic field intensity applied to the tape significantly varies. As a result, the d.c. residual magnetization m usually remains at a finite value and can not be neglected. When recording or reproduction is performed by using such a tape with a definite d.c. residual magnetization, large distortion of even harmonics is generated.

SUMMARY OF THE INVENTION

This invention is aimed to solve these defects in the prior art, and the objective thereof is to provide a magnetic erasing head which can reduce the distortion of even harmonics and the noise.

Next is made a brief description of the accompanying drawings for explanation of this invention, in which.

Figure 6:
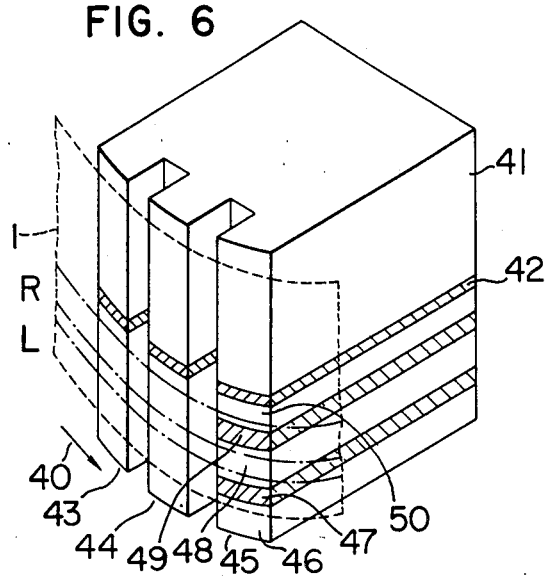
FIG. 6 is a perspective view of the structure of a permanent magnet erasing head according to one embodiment of this invention.

Explanation of the embodiments of this invention will be made hereinafter. FIG. 6 shows one embodiment of the magnetic erasing head according to this invention. In this figure, 1 denotes a magnetic tape for a compact cassette or a microcassette. The direction of movement is shown by an arrow 40. R and L tracks to be erased are shown by characters R and L. 41 is a non-magnetic material which has a width nearly equal to a half of the width of tape 1. A part of tape 1 makes contact with element 41 before erasure. 42 is a shield plate formed by a high permeability material such as permalloy for preventing any cross-erasure. 43, 44 and 45 are first, second and last magnetic poles, respectively. The first magnetic pole 43 has a height larger than the width of the to be erased part of the magnetic tape 1 and generates a magnetic field intensity strong enough to saturate the magnetic tape. The second magnetic pole 44 has also a height larger than the width of the to be erased part of the magnetic tape 1 but an opposite polarity to that of the first magnetic pole. The magnetization intensity of the second pole is less than that of the first pole but generates a magnetic field larger than the coercive force of the to be erased tape. The last magnetic pole 45 with which the tape 1 makes contact in the final stage is constituted with a plurality of magnetic poles arranged or stacked in the direction of the tape width. Here, this last magnetic pole is composed of five sub-poles 46, 47, 48, 49 and 50; N, S, N, S, N or S, N, S, N, S poles from bottom. The field intensity of the magnetic poles 46 to 50 is nearly equal to or less than that of the second magnetic pole 44. The last magnetic pole 45 may be formed by superimposing preliminarily magnetized magnet plates such that poles N, S, N, etc. appear at the sliding surface of the tape. Alternatively, it may be formed by disposing magnet materials and high permeability materials alternately and magnetizing them such that the magnet materials form N-poles while the magnetic poles induced by the high permeability materials form S-poles for the sliding surface of the tape. In the example shown here, the last magnetic pole is formed by a combination of high permeability materials 47 and 49 and magnet materials 46, 48 and 50. The thicknesses of the high permeability materials 47 and 49 are about a half the width of R and L tracks of the tape 1. They are positioned at the central part of each track. It is so arranged that, even if the tape meanders vertically, about the half part of the track is magnetized by an N pole while the remaining half part is magnetized by an S pole.

Figure 3:
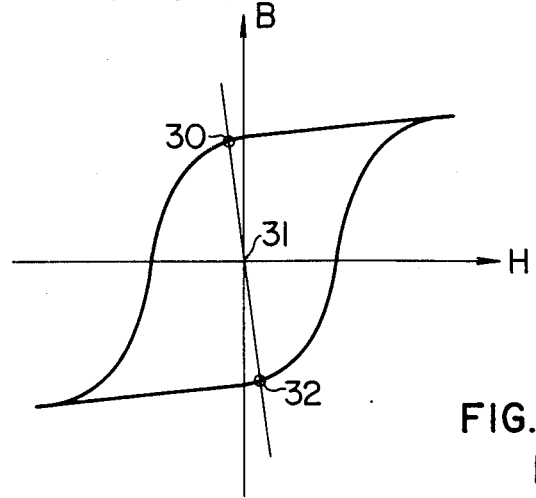
FIG. 3 is a diagram of the B-H curve of a magnetic tape showing the residual magnetization after saturation erasure.
Figure 4:
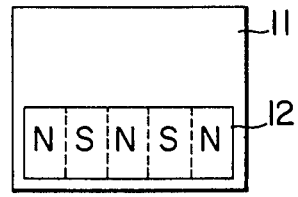
FIG. 4 is a plan view of a prior art magnetic erasing head of a gradual decreasing alternating field type.
Figure 5:
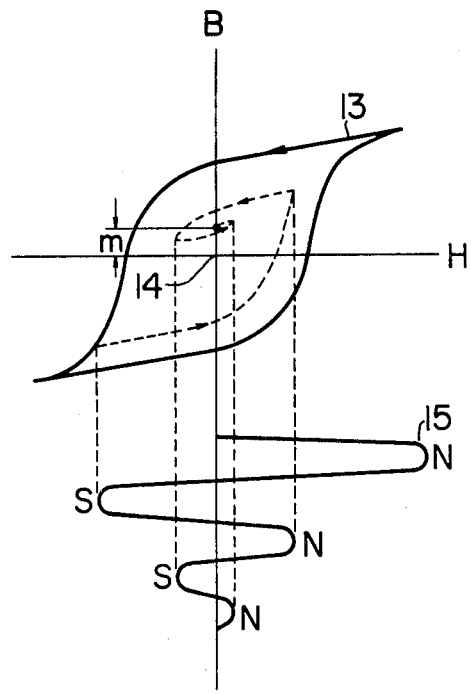
FIG. 5 is a diagram showing the erasing process in which a magnetic tape is erased by the above-mentioned head.
Figure 7:
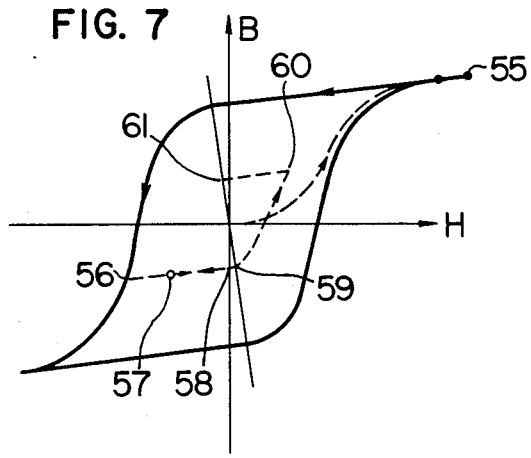
FIG. 7 is a diagram of the B-H curve showing the state of a tape while being subjected to the magnetic field intensity of the above-mentioned head.
Figure 8:
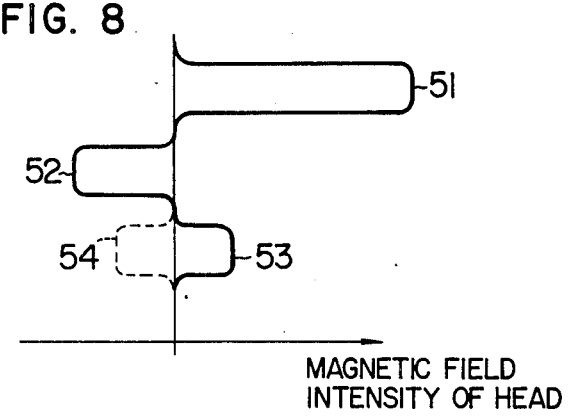
FIG. 8 is a distribution diagram of the magnetic field intensity of the above-mentioned head.

Therefore, the residual magnetizations of R and L tracks after erasure tend to cancel each other. Since the intensity ratio of these magnetizations is 1:1, there is an effect of avoiding the generation of distortion of even harmonics. Furthermore, the erasing head with the above-mentioned arrangement of magnetic poles has an advantage of having smaller DC erasure noise than the conventional erasing head of saturation erasure type. The reason will be explained next with reference to FIGS. 7 and 8. FIG. 7 shows the B-H curve of a magnetic tape to be erased, and FIG. 8 shows the magnetic field intensity of each magnetic pole of the erasing head of the present embodiment. In FIG. 8, 51 denotes the magnetic field intensity of the first magnetic pole 43 while 52 denotes that of the second magnetic pole 44. 53 and 54 denote the magnetic field intensities of the last magnetic pole 45. 53 indicates the intensity at the tape sliding part of the magnet materials 46, 48 and 50, and 54 indicates the intensity at the tape sliding part of the high permeability materials. It is possible to reverse the polarity of magnetization in such a manner that 53 indicates the intensity of high permeability materials while 54 indicates that of the magnet materials at the sliding parts. In any case, about a half part of each track R and L of tape 1 is subjected to the magnetic fields 51, 52 and 53 while the remaining part of each track is subjected to the magnetic fields 51, 52 and 54. When the magnetic tape is exposed to the field intensities 51, 52 and 53, the magnetic tape is saturated by the magnetic field 51 without regard to the initial condition of residual magnetization of the magnetic tape. This corresponds to a point 55 on the B-H curve. The tape flux density B changes to pass points 56, 57, 58, 59 and 60 on the B-H curve as the pole magnetic field varies as shown by 52 and 53, and assumes a point 61 corresponding to the final residual magnetization. Under the influence of the magnetic fields 51, 52 and 54, the tape flux density B changes to pass points, 55, 56, 57 and 58, thereafter to return to a point in the vicinity of a point 57 in the third cartesian quadrant, and finally to assume a point in the vicinity of a point 59. Therefore, when erasure is performed by the present erasing head, the residual magnetizations remain at or near points 61 and 59. These values are smaller than the values of residual magnetizations at points 30 and 32 (cf. FIG. 3) in the case of erasure by the conventional erasing head. DC noise is enhanced when the magnetic particle distribution in the tape is not uniform or when the difference of particle size is remarkably large. The noise level increases more in the neighborhood of the saturation magnetization. In the erasing head of the present embodiment, since the residual magnetization is reduced as described above, DC noise becomes smaller than that of an erasing head of a prior art saturation erasure type. It is possible to further decrease the residual magnetizations from the points 61 and 59 more by setting the intensities of magnetic fields 52, 53 and 54 of the second and last magnetic poles 44 and 45 at a suitable value. Furthermore, according to the erasing head of this invention, even if the residual magnetizations are not nearly equal to zero, they cancel with each other due to their opposite polarities. Thus, the erasing head of this invention has the same merit as that of the prior art magnetization erasing head (cf.

Figure 1:
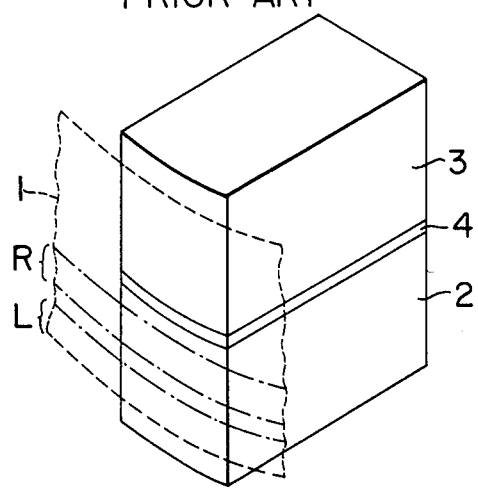
FIGS. 1 and 2 are perspective views of the constitution of prior art permanent magnet erasing heads.
Figure 2:
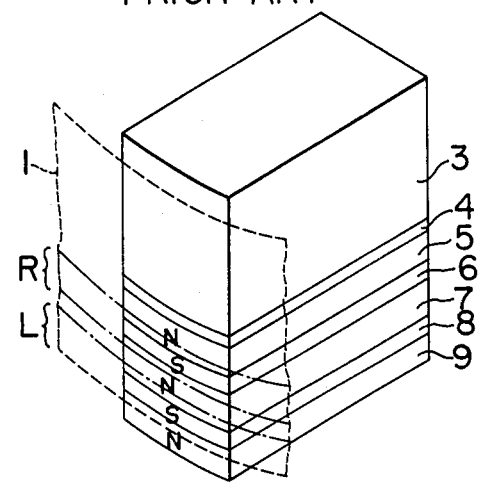

FIG. 2) of a track division method; i.e. the generation of distortion of even harmonics is extremely small.

Although the above explanation has been made of an erasing head having three magnetic poles: that is, the first, the second and the last magnetic poles, the invention is not limited to this case. It is possible to provide an erasing head with more than four magnetic poles which form a distribution of gradually decreasing magnetic fields outside the last pole.

Figure 9:
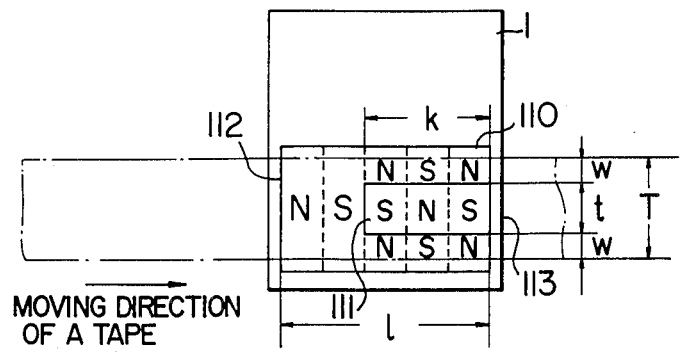
FIG. 9 is a plan view of a magnetic erasing head according to another embodiment of this invention.

FIG. 9 shows another embodiment of a magnetic erasing head according to this invention. In this figure, the erasing head is formed by magnet material and high permeability material which have a tape sliding surface 1 in contact with a magnetic tape. The magnet material 110, which has a width a little larger than the track width T of the magnetic tape, is disposed in the tape sliding surface 1. The high permeability material 111 is embedded in this magnet material 110, and has a length k, in the moving direction of the tape, which is smaller than the length l of the magnet material 110. Furthermore, this high permeability material 111 is placed at central portions of the width of the magnet material 110 and of the track width T of the magnetic tape on the exit side 113 of the tape in the moving direction. The width t of the high permeability material 111 is about a half the track width T of the magnetic tape to be erased. The magnet material 110 of the erasing head element with the abovementioned structure is magnetized by gradually decreasing alternating magnetic fields. By the magnetization, magnetic poles as shown in FIG. 9 are formed in the sliding surface of the erasing head. Namely, the magnetic field has a gradually decreasing distribution from the inlet side 112 of the tape to the exit side 113 of the tape. In the parts only of the magnet material 110 (the parts with a width W), the distribution becomes N, S, N, S, N while in the part inclusive of the high permeability material 111 (the part with a width t) the distribution becomes N, S, S, N, S. The high permeability material 111 forms magnetic poles with an opposite polarity to that of the surrounding magnets.

Figure 10:
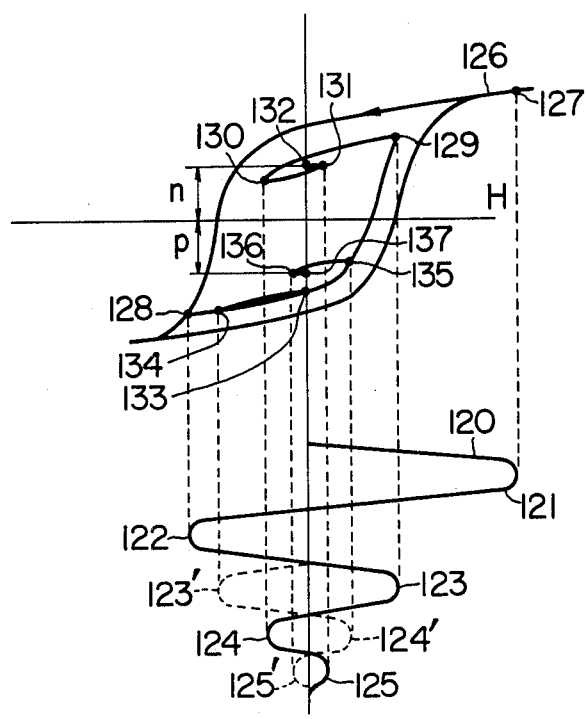
FIG. 10 is an explanatory view of the erasing process of a magnetic tape by the above-mentioned head.

Next, explanation will be made of the operation of the magnetic erasing head which erases a magnetic tape with reference to FIG. 10. In this figure, 120 denotes the magnetic field distribution curve of the erasing head of the present example. As described above, each part with a width W of the magnet material 110 generates gradually decreasing magnetic fields 121, 122, 123, 124 and 125, while the part with a width t generates gradually decreasing magnetic fields 121, 122, 123', 124' and 125'. The fields 123', 124' and 125' have an opposite polarity but a nearly equal amplitude to those of the fields 123, 124, and 125 respectively. 126 denotes the B-H curve of a magnetic tape to be erased. The magnetization of the tape due to alternating magnetic fields 121, 122, 123, 124 and 125 from the erasing head follows a path from a major loop to a minor loop through 127→128→129→130→131→132, and finally stays at a point of residual magnetization n. Magnetization of the part near the track center (part with a width t) of the magnetic tape subjected to the magnetic fields 121, 122, 123', 124' and 125' follows a path 127→128→133→134→135→136→137 and finally stays at a point of residual magnetization p. The residual magnetizations n and p are opposite in polarity but nearly equal in the absolute value. If recording or reproduction is performed by using a magnetic tape with a uniform residual magnetization n or p, the phenomenon of large distortion of even harmonics occurs. However, according to the method of this embodiment, since the residual magnetization in a track has regions with different polarities (n and p) and the ratio of these regions (a part with a width t and a part on each side thereof with a width W) is nearly 1:1, distortion of even harmonics of the regions are cancelled with each other.

Although the above embodiment has shown a magnetic erasing head with five magnetic poles, the invention is not limited to this embodiment. Furthermore, although the high permeability material 111 is inserted from the third pole from the inlet side 112 of the magnetic tape toward the exit side 113 of the magnetic tape, it may be possible to determine a suitable insertion position depending on the kind of magnetic tape to be erased and the field intensity of each magnetic pole of the erasing head so that even harmonic distortion may become least.

What is claimed is:

1. A magnetic erasing head comprising an erasing surface having an inlet side and an exit side for making sliding contact with an advancing magnetic recording medium, said surface comprising a permanent magnet material magnetized to include a series of portions disposed transversely relative to a recording track of said medium which have alternate polarities and which gradually decrease in magnetic intensity along a direction from said inlet side toward said exit side relative to an advancing direction of said medium with respect to said head, and a high permeability material embedded in at least one of said portions disposed on said exit side and having a predetermined length extending along said advancing direction, a width substantially equal to one-half of a width of said recording track of said medium and positioned substantially in alignment with a center of said recording track when said medium is moved past said head during an erasing operation.

2. A magnetic erasing head according to claim 1, wherein said predetermined length of said high permeability material is shorter than a length of said permanent magnet material in said advancing direction of said medium.

3. A magnetic erasing head for erasing a recording track on a magnrtic tape, comprising a series of first to last magnetic poles of decreasing magnetic intensity and alternating polarity arranged along a direction of advance of the recording tape such that said first pole is disposed at an inlet side and said last pole is disposed at an exit side relative to said direction of advance, at least said last pole being a composite pole having for said recording track an inner section of opposite polarity to and interposed between outer sections of said last pole, said outer sections extending transversely of said recording track, the inner section having a width approximately equal to one-half the width of the recording track and being centrally disposed in relation thereto.

4. A magnetic erasing head according to claim 3, wherein said inner section comprises a section of high permeability material.

5. A magnetic erasing head according to claim 4, wherein said poles of alternating polarity are contiguous, and said section of high permeability material extends through a number of said poles less than a total number from a downstream side of said head relative to said direction of advance.

6. A magnetic erasing head according to claim 3, comprising at least three said poles and wherein said first pole generates a magnetic field strong enough to saturate the recording tape.

7. A magnetic erasing head according to claim 6, wherein said composite pole comprises a stack of alternate layers of permanent magnets and high permeability materials extending widthwise across the recording tape.

* * * * *